United States Patent [19]

Wolters

[11] Patent Number: 4,681,000
[45] Date of Patent: Jul. 21, 1987

[54] FOOD PREPARATION PROCESS

[76] Inventor: Karen A. Wolters, Lake Sara, Knolls Subdivision, R.R. 2, Box 311-A, Effingham, Ill. 62401

[21] Appl. No.: 693,755

[22] Filed: Jan. 23, 1985

[51] Int. Cl.$^4$ ............................................. B26D 9/00
[52] U.S. Cl. ........................................ 83/862; 30/301; 30/316; 83/40; 83/870; 426/104; 426/518
[58] Field of Search ................. 30/130, 301, 316, 302; 426/104, 481, 479, 503, 518; 83/40, 862, 870

[56] References Cited

U.S. PATENT DOCUMENTS

| | | | |
|---|---|---|---|
| 1,466,114 | 8/1923 | Buchi | 30/302 |
| 3,036,377 | 5/1962 | Paulson | 30/301 |
| 3,363,311 | 1/1968 | Towers | 30/301 |
| 3,864,829 | 2/1975 | Williams | 30/130 |

FOREIGN PATENT DOCUMENTS 788641 7/1935 France ................................ 30/301

*Primary Examiner*—R. L. Spruill
*Assistant Examiner*—Donald R. Studebaker
*Attorney, Agent, or Firm*—Marshall, O'Toole, Gerstein, Murray & Bicknell

[57] ABSTRACT

Method for cutting food materials having predetermined depths defined by a proximal surface and a remote surface, into a desired, continuous, closed configuration. A food material is selected having a predetermined depth. The desired configuration is cut into the food material by inserting therein at the proximal surface blade means having a cutting edge defining at least the exterior outline of the desired, continuous, closed configuration, while maintaining the cutting edge of the inserted blade means spaced from the remote end of the food material. The blade means is then removed from the food material while leaving the cut configuration substantially intact in the food material. Removal from the food material of the desired cut configuration when the blade means is removed is prevented by avoiding excessive compression of the food material when the blade means is inserted in the food material. The food material is then sliced, at an angle transverse to the direction of insertion of the blade means, into one or more, slices each containing the desired configuration and the cut configuration is separated in the substantially intact condition from the remainder of its slice.

19 Claims, 8 Drawing Figures

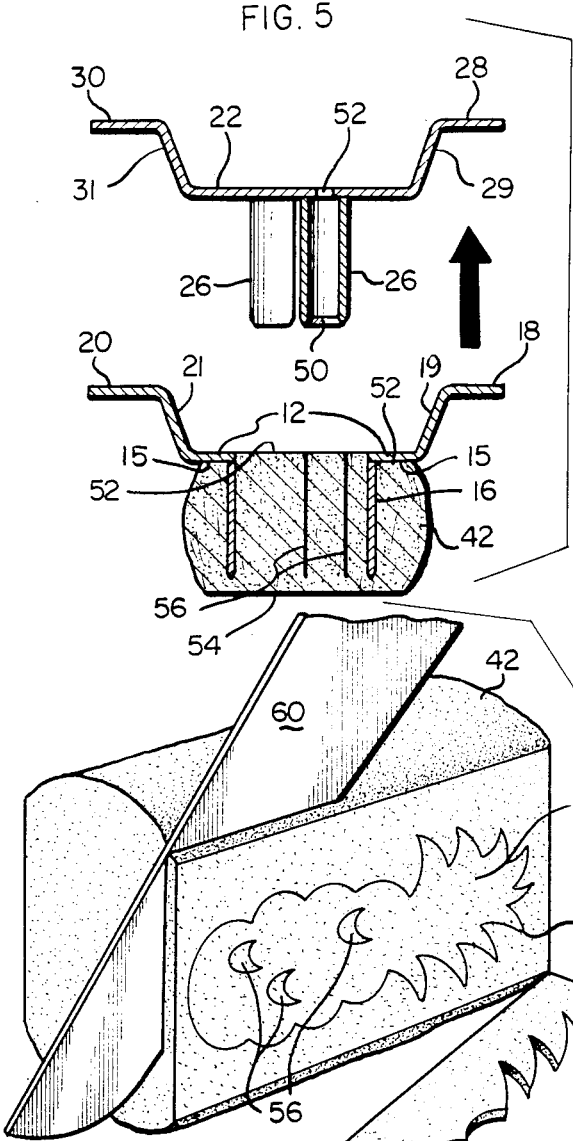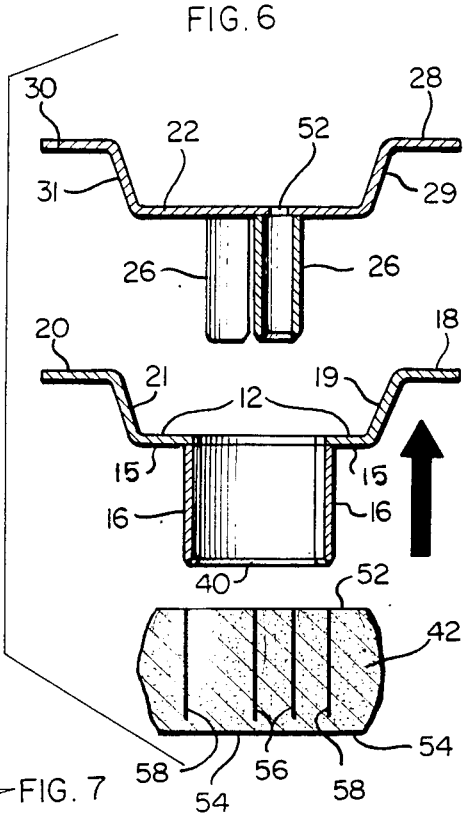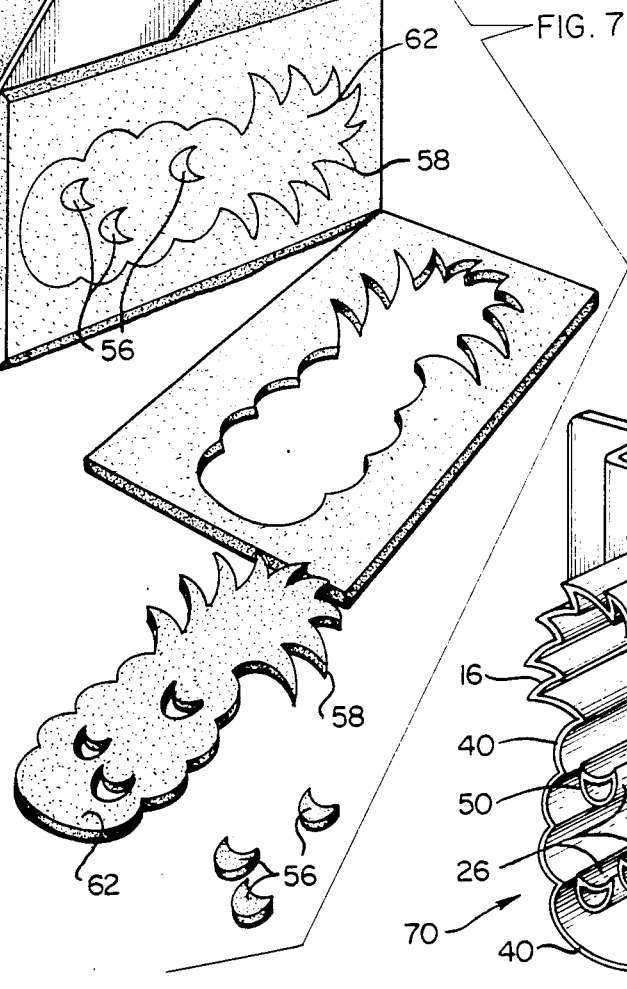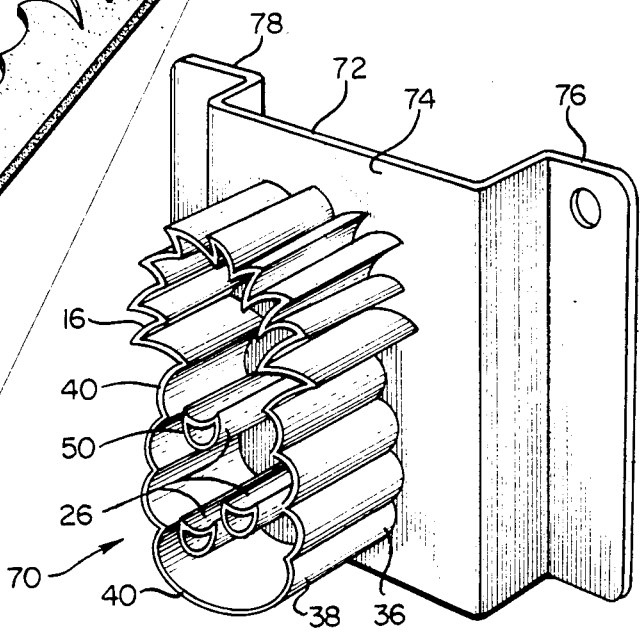

FOOD PREPARATION PROCESS

BACKGROUND OF THE INVENTION

The present invention relates generally to food cutting devices and more specifically to food cutting devices adapted for cutting food into a desired ornate shape or configuration.

One method of enhancing the consumer's interest in a given food is to vary the form in which the food is presented. Included in such variation is the technique whereby the food is cut into a desired configuration which is esthetically pleasing to the consumer. Examples of such ornately prepared food products are known and include baked goods such as animal-shaped crackers, Christmas cookies, and the like. The cutting device employed to produce the desired shaped food product may include a knife, although hand-cutting the design is tedious and leads to variation in results. Typically the preparer employs a hand-held cutter which has a cutting edge shaped to conform to the outline of the desired configuration. The cutter is inserted in a layer of dough rolled into a flat sheet and removed leaving the configuration cut in the dough or stuck inside the cookie cutter. The cut design is then removed from the dough or cookie cutter and placed in an oven for baking.

The above-mentioned cutters often generally referred to as "cookie cutters" produce acceptable results when used on relatively flat, soft food products such as rolled dough. However, other food products not susceptible of or not desired to be prepared in a dough form cannot be readily cut into the desired ornate configurations with a cookie cutter. Vegetables, fruits and other firm natural foods break apart or become lodged in a cookie cutter (making removal of the configuration difficult or impossible) when one attempts to cut them with the cookie cutter. Further, the metal employed in most cookie cutters is usually too soft and/or thin to cut firm fruits or vegetables without bending. Cookie cutters are also intended to prepare one cut food product per use, requiring that the cookie cutter be inserted and removed from the food for each desired ornamental food product, thus increasing the probability of the food breaking apart or becoming lodged within the cutter. Cutting firm vegetables or fruits into ornate designs by hand with a knife is very tedious and unlikely to produce consistent results.

Of interest to the present invention are the following reports of food cutting devices intended to cut rolled soft dough or vegetables into relatively simple configurations: Hewett, U.S. Pat. No. 337,329; Compton U.S. Pat. No. 493,684; Carsley, U.S. Pat. No. 865,628; and Spence, et al., U.S. Pat. No. 944,700. Hewett discloses a biscuit cutter for cutting rolled dough into multiple hexagonal-shaped biscuits. Compton discloses a cylindrical potato chopper intended for chopping cold boiled potatoes into pieces for reheating and for cutting cakes and pastries. The Carsley patent describes a cylindrical vegetable cutter or chopper having concentric cylindrical cutting members. Spence, et al. discloses a cylindrical combination vegetable and pastry cutter, the pastry cutter being of a relatively shallower cylindrical depth relative to the cylindrical vegetable cutter and serving as the handle for the vegetable cutter when attacked thereto.

Of particular interest to the present invention is the fact that no vegetable or fruit cutter reported provides for ornate configurations to be cut into the food apart from cylindrical or circular shapes which do not greatly enhance the estetic appeal of the food product. It also appears that all the reported vegetable cutters would require multiple insertions into and removals from the vegetable to provide more than one cylindrical or circular configuration food product.

There exists, therefore, a need in the art for simple, easy to use food cutters which provide ornate cut configurations from vegetables, fruits and other firm foods.

BRIEF SUMMARY

The present invention provides novel food cutter devices or apparatus for cutting food such as vegetables, fruits and other firm food products into ornate desired configurations which when cut remain substantially intact in the food and which are readily separable from the food in the substantially intact desired configuration.

Food cutter devices according to the invention are adapted to provide ornately cut food products from a variety of vegetables and fruits such as carrots, turnips, squash, potatoes, apples or any other firm vegetable or fruit.

A presently preferred embodiment of the present invention includes a food cutter comprising a blade support and a cutting blade attached to the blade support, the cutting blade being adapted to conform to the exterior outline of the desired configuration and having a cutting edge supported at a position above the blade support sufficient to allow the cutting blade to be inserted in the food and removed leaving the desired configuration substantially intact in the food and readily removable from the food in the substantially intact desired configuration.

A second preferred embodiment of the present invention includes food cutter devices comprising a blade support, an outer cutting blade attached to the support and adapted to conform to the exterior outline of the desired configuration, and inner cutting blades attached to the support within the exterior outline defined by the outer cutting blade and adapted to provide internal features corresponding to the exterior outline of the desired configuration. Both the outer and inner blades have cutting edges supported at positions above the blade support to allow the blades to be inserted in the food and removed leaving the desired configuration cut substantially intact in the food and readily removable from the food in the desired configuration.

Another presently preferred embodiment of the present invention includes food cutters comprising outer cutting blades, inner cutting blades and two blades supports. One blade support supports the outer cutting blades which are adapted to conform to the exterior outline of the desired configuration and the other blade support supports the inner cutting blades which are adapted to provide internal features corresponding to the exterior design within the exterior outline defined by the outer blade. Both blade supports are adapted to support the cutting edges of the inner and outer cutting blades at positions above the supports to allow the blades to be inserted and removed either separately or simultaneously from the food leaving the desired configuration cut substantially intact in the food and readily separable from the food in the substantially intact desired configuration.

Numerous aspects and advantages of the present invention will become apparent upon consideration of the following detailed description, along with the accompanying drawings.

BRIEF DESCRIPTION OF THE DRAWINGS

In the drawings,

FIGS. 4-6 are fragmentary sectional sequential views of one manner of operation of the food cutter shown in FIG. 3;

FIG. 7 is an elevated perspective view showing separation of the pineapple configuration resulting from the operation of the food cutter shown in FIGS. 3-6 from the food; and FIG. 8 is an elevated perspective view of another embodiment of a food cutter in accordance with the present invention showing a pineapple configuration food cutter having the cutting means providing the exterior outline of the pineapple and the structures providing the interior features supported by the same cutting means support.

DETAILED DESCRIPTION

Figure 1:
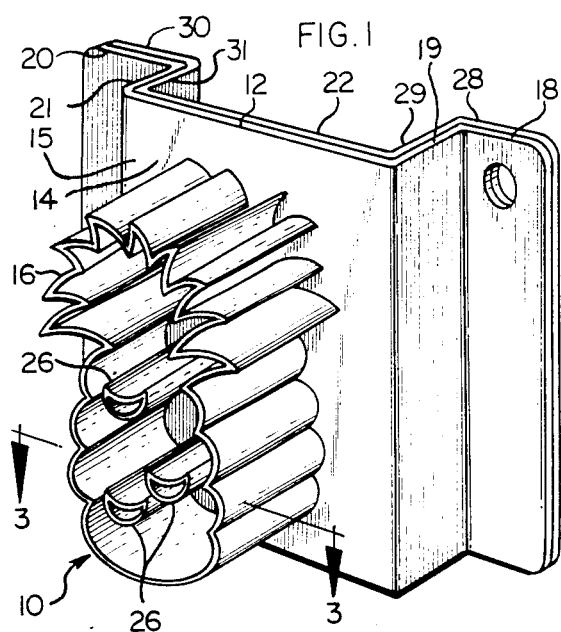
FIG. 1 is an elevated perspective view of one embodiment of a food cutter in accordance with the present invention showing a pineapple configuration food cutter.
Figure 2:
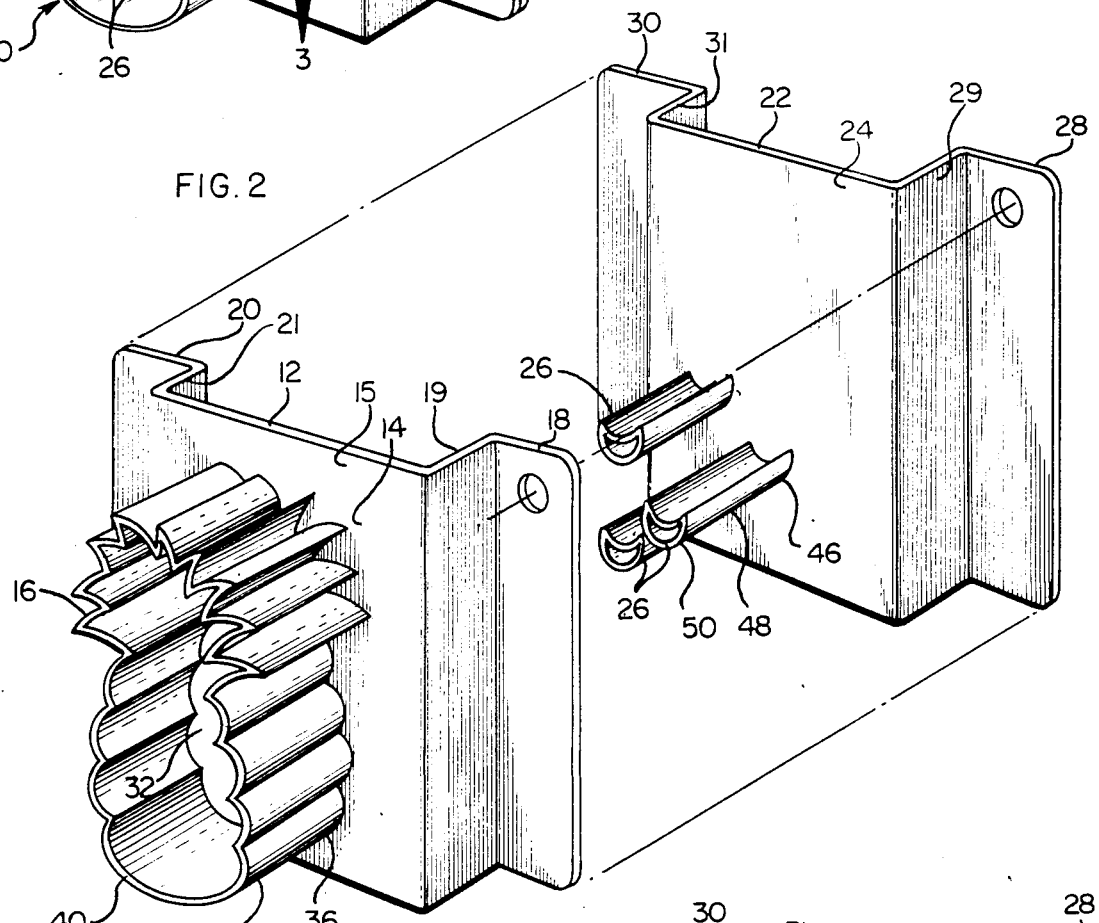
FIG. 2 is an exploded elevated perspective view of the food cutter shown in FIG. 1 showing the cutting means providing the exterior outline of the pineapple supported on one cutting means support and the cutting means providing the interior features of the pineapple being supported on a second cutting means support.

Referring to the drawings, and more particularly to FIGS. 1 and 2, according to the present invention there is provided a food cutter or apparatus 10 comprising an outer or first cutting means support 12 having a surface 14 supporting outer or exterior cutting means 16 and having holding or handle means 18 and 20 rigidly attached to outer or exterior cutting means support 12, and an inner, or second cutting means support 22 having a surface 24 supporting inner or interiors cutting means 26 and having fingergrips or handle means 28 and 30 rigidly attached to inner cutting means support 22. Outer cutting means support 12 and inner cutting means support 22 may be constructed of metal or any other strong material which provides a surface adequate to rigidly support outer cutting means 16 and inner cutting a means 26 and maintain the inner cutting means at a position within the outer cutting means. As illustrated here, the outer cutting means support and inner cutting means supports consist of flat or planar stainless steel metal sections capable of being brought into contact with one another allowing inner cutting means 26 to be brought into alignment within hole or mounting means 32 in outer cutting means support surface 14 and within outer cutting means 16. FIGS. 1-4, holding means 18,20, and 28,30 are rigidly attached to respective wall means 19, 21 and 29, 31 rigidly attached at an angle to cutting means support surfaces 12 and 22, respectively, and consist of metal or other strong material of a shape adequate to provide the food cutter user with sufficient grip to securely hold the food cutter. As illustrated here, the holding means comprises fingergrips consisting of angle sections provided by bending the outer edges of the respective wall means of the respective stainless steel metal cutting means supports so that the finger-grip portions for inner cutting means support 22 is capable of being brought into close contact with the corresponding fingergrips 18 and 20 of the outer cutting means support 12, providing a means for further alignment or direction of inner cutting means 26 within the outer cutting means 16.

Figure 3:
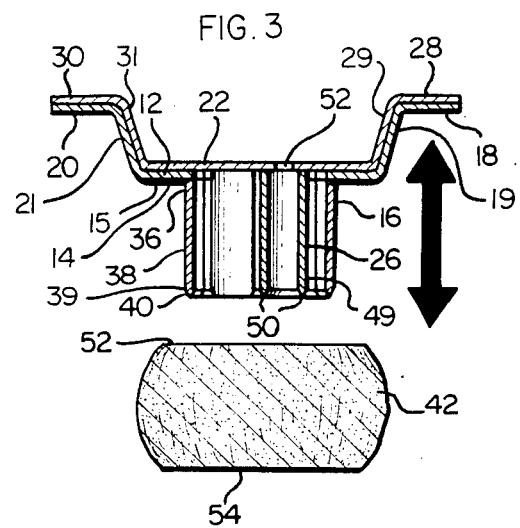
FIG. 3 is a sectional view of the food cutter of FIG. 1 taken along section line 3—3 of FIG. 1 and showing the food cutter being readied for insertion in and removal from food.

As best shown in FIGS. 1-3, outer cutting means 16 comprises a cutting means having an interior continuous, closed configuration adapted to conform to or define exterior outline of the desired configuration of the cut food product. As illustrated here, outer cutting means 16 consists of a blade means having a lower blade edge support portion or proximal end 36 rigidly attached to the outer cutting means support surface 14 and rigidly supporting an intermediate blade portion 38 rigidly supporting an upper blade cutting edge 40 at upper remote end 39 of the cutting blade. As shown in the drawings, cutting edge 40 is supported at a substantially uniform predetermined distance from the proximal end and conforms to the continuous, closed configuration. Outer cutting means 16 may be constructed of heavy plastic, metal or any other material capable of being shaped into the desired configuration, providing a cutting edge capable of cutting the food and being strong enough to maintain the desired configuration during cutting of the food. The outer cutting blade illustrated here consists of a stainless steel cutting blade shaped by machine stamping strip stainless steel into a die and soldering the ends together by hand to provide the continuous, closed desired configuration and soldered to outer cutting means support surface 14 to extend generally perpendicular from the surface. As shown in FIGS. 1-6, the cutting blade includes structure for maintaining the cutting edge in the food material spaced from remote surface 54 of the food material when proximal end 36 is at proximal surface 52 of the food material. This structure includes a predetermined dimension between the cutting edge and proximal end of the cutting blade less than the predetermined depth of the food material defined by proximal surface 52 and remote surface 54. This structure also includes a portion 15 attached to proximal end 36 of the cutting blade which contacts proximal surface 52. The cutting blade has a blade thickness and is constructed or oriented on the support surface to provide a cross section across the desired configuration sufficient to prevent the food from being overly compressed during cutting and thus facilitating the cutting process and preventing or precluding the food from becoming lodged in the food cutter when the blades are removed from the food. As illustrated here, the cutting blades are attached generally perpendicular to the outer cutting support surface, and provide a substantially uniform cross section across the food product at a given depth cut all the way from the proximal end to the cutting edge. Cutting edge 40, as shown here, is provided by selecting stainless steel strips of a relatively small thickness or by hand-filing the upper edge of outer blade 16 after lower blade support portion 36 is welded to outer blade support surface 14 when brass cutting blades are employed, although other well-known methods of attachment and/or providing the upper cutting edge 40 may also be utilized. Outer cutting blade 16 extends generally outward from blade support surface 14 to provide outer cutting blade edge 40 at a position sufficient to allow the cutting blade to be inserted into proximal surface 52 of the food and removed leaving the desired configuration cut substantially intact in the food. I have found that food cutters according to the invention having stainless steel cutting blades of about 1/100 inch thickness aligned or angularly disposed to prevent over-compression of the food during cutting and ease of insertion and having an outer cutting edge at a position defining a predetermined dimension of about ¾ inch above the cutting blade support surface and the proximal end of the blade to be a presently preferred embodiment for cutting a variety of vegetables and fruits. Positioning the cutting edge at greater or lesser positions above the support on other thickness blades aligned or angularly disposed to prevent over-compression of the food during cutting may also provide the desired result of providing the desired configuration substantially intact in the food depending on the firmness and thickness of the food to be cut. Depending on the materials employed, the cutting blade and blade support may be coated with chrome or other non-corrosive coating to prevent the cutter from discoloring the food product.

Similarly, as best shown in FIGS. 1-3, food cutter 10 may also comprise inner cutting means or interior blade means 26 having an interior configuration adapted to conform to interior features of the desired configuration of the cut food product. As illustrated here, inner cutting means 26 consists of blade means having lower blade edge support portions or proximal end 46 rigidly attached to inner cutting means support surface 24 of inner cutting means support or second support means 22 and rigidly supporting intermediate blade portions 48 rigidly supporting remote end 49 having a inner blade cutting edge 50. Cutting edge 50 is supported at a substantially uniform position from proximal end 46. Inner cutting means may be constructed of the same material used in the construction of outer cutting means such as stainless steel other metal or other strong material and coated with a non-corrosive coating such as a chrome coating if necessary. As shown here, the inner cutting means consists of stainless steel blades machine-shaped to conform to or define the interior features of the desired configuration and attached to inner cutting means support surface 24 by soldering lower inner blade edge support portion 46 to the surface or by other well-known attachment procedures. The inner cutting means are attached to support surface 24 at positions which bring them into alignment within hole or mounting means 32 cut into outer cutting means support surface 14 thereby positioning or removably mounting the inner cutting means within the configuration defined by outer cutting means 16. Inner cutting edges 50 are preferably provided at about the same position above the outer cutting blade support surface as outer cutting edge 40 when the inner cutting means support surface is brought into contact with the outer cutting means support surface so as to provide a similar depth cut in the food. As shown in the drawings, inner cutting means 26 has a predetermined dimension defined by cutting edge 50 and proximal end 46 less than the predetermined depth of the food material. The inner cutting means also preferably have intermediate portions 48 of a thickness and are constructed to provide a cross section sufficient to prevent food from becoming overly compressed and sticking inside the inner cutting means during cutting, although retention of food within the inner cutting means is not critical since the interior features of the desired configuration are provided by removal of the cut interior features from the desired configuration as shown in FIG. 7. To facilitate removal of food retained in interior cutting means cleaning holes 52 may be provided in inner cutting means support surface 24 adjacent the interior of the inner cutting means.

Figure 4:
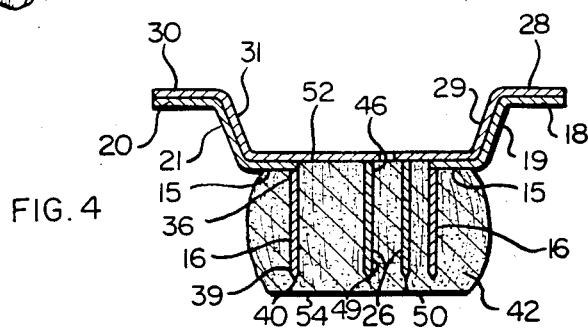

Ornate food products are provided according to this embodiment of the invention best shown in FIGS. 3-7 as follows. The chosen food 42 is prepared by slicing rounded edges on opposite sides to provide flat proximal remote surface 52 and 54 on opposite sides defining the predetermined depth of the food material. Prepared food 42 is placed on a flat surface such as a table or cutting board, food cutter 10 is held by fingergrips 18,20 and 28,30 above one surface or proximal surface 52 of the food and exterior cutting means 16 and interior cutting means 26 are inserted in the food by pushing the food cutter into the food as shown in FIGS. 3 and 4. As shown in the drawings, cutting edge 40 is inserted at proximal surface 52 and is maintained in the food material spaced from remote surface 54. Interior cutting means 26 may then be removed by pulling interior cutting means support 22 out of the food by fingergrips 18,20 leaving interior cut features 56 in the food as shown in FIG. 5. Exterior cutting means 16 may then be removed from the food leaving exterior cut desired configuration 58 in the food as shown in FIG. 6. The food is then turned on one side and sliced by a knife 60 or other slicing means across the cut area of the food at an angle transverse to the direction of insertion of the cutting blade, the desired cut configuration 62 falling out of or separating from each slice as shown in FIG. 7 until the slice includes food not cut by the food cutter.

According to another embodiment of the present invention, best illustrated by FIG. 8, food cutter 70 comprises a cutting means support 72 having a cutting means support surface 74 rigidly attached to holding or handle means 76 and 78 on opposite sides of the cutting means support, the cutting means support supporting both exterior cutting means 16 and interior cutting means 26. Food cutter 70 may be constructed utilizing the same materials and procedures outlined above for construction of food cutter 10 except that interior cutting means 26 are attached to the same cutting means support surface 74 as the exterior cutting means 16 at position within the exterior outline defined by the outer cutting means. Interior cutting means cleaning holes may be provided in the surface adjacent the interior of the interior cutting means if necessary.

Food cutters according to the present invention provide for ornately cut food products from vegetables, fruits and other firm foods to be made without causing the desired configurations to break apart or become lodged in the food cutter. The desired configurations, being cut in the food product substantially intact, are readily separable from the food by simply slicing the food across the cut area, allowing the user to make two or more ornate configurations of the same or varying thickness determined in part by the use intended for the ornate food product. Food cutters of the present invention are also simple to operate allowing for use in the home as well as commercial use.

Numerous modifications and variations of the invention as illustrated above and in the drawings are expected to occur to those skilled in the art. As one example, the above description illustrates the food cutters wherein the cutting means support surfaces are substantially flat and the cutting means are attached substantially perpendicular to the support surfaces to provide the cutting edges at positions allowing for the desired configuration to be cut in the food substantially intact and readily separable therefrom in the substantially intact desired configuration. Similarly, the cutting means support surfaces and/or the cutting means may be curved or other shapes and still provide adequate cuts of the desired configurations substantially intact in and separable from the food product. Consequently, only those limitations that appear in the appended claims should be placed on the invention as above described.

What is claimed is:

1. A method for cutting a food material, having a predetermined depth defined by a proximal surface and a remote surface, into a desired, continuous, closed configuration, said method comprising the steps of:
   (a) selecting a food material having said predetermined depth;
   (b) cutting said desired configuration into said food material by inserting therein at the proximal surface blade means having a cutting edge defining at least the exterior outline of said desired, continuous, closed configuration;
   (c) maintaining said cutting edge of the inserted blade means spaced from the remote end of the food material;
   (d) removing said blade means from the food material while leaving said cut configuration substantially intact in the food material;
   (e) preventing the removal from said food material of said desired cut configuration when the blade means is removed by avoiding excessive compression of the food material when the blade means is inserted in the food material;
   (f) slicing said food material, at an angle transverse to the direction of insertion of the blade means, into one or more slices each containing the desired configuration; and
   (g) separating said cut configuration in said substantially intact condition from the remainder of its slice.

2. A method according to claim 1 wherein said cutting step (b) comprises:
   inserting into said proximal surface of the food material blade means having a proximal end, a remote end and a cutting edge, conforming to said continuous, closed configuration, at said remote end;
   defining at least the exterior outline of said desired configuration with said blade means and said cutting edge;
   and employing said blade means and said cutting edge to cut said desired configuration into said food material when the blade means is inserted into the food material at said proximal surface.

3. A method according to claim 2 and comprising:
   assuring a uniform exterior outline on all configurations sliced from said food material by extending each cutting edge of said blade means a substantially uniform distance from said proximal end of said blade means.

4. A method according to claim 1 wherein said step (c) for maintaining the cutting edge of the inserted blade means spaced from the remote end of the food material comprises:
   inserting into said food material blade means having a proximal end, a remote end and a cutting edge, conforming to said continuous, closed configuration at said remote end;
   providing said blade means with a predetermined dimension, between said proximal end and said cutting edge, which is less than said predetermined depth of the food material;
   and employing said predetermined dimension to maintain said cutting edge of the blade means within the food material, spaced from the remote surface of the food material, when said proximal end of the blade means is at the proximal surface of the food material.

5. A method according to claim 4 wherein said step of maintaining said cutting edge spaced from said remote end of the food material comprises:
   employing means, attached to the proximal end of the blade means, to prevent insertion of the blade means past said proximal end.

6. A method according to claim 5 wherein said step of preventing insertion of the blade means comprises:
   employing means, extending transversely from said proximal end of the blade means, to contact said proximal surface of the food material.

7. A method according to claim 4 and comprising:
   providing said blade means with a predetermined dimension large enough to permit at least two of said desired configurations to be separated from said food material when the food material is sliced into at least two slices each containing the desired configuration and each having a thickness less than said predetermined dimension of the blade means.

8. A method according to claim 7 wherein:
   said predetermined dimension is about 0.75 inches (1.91 cm).

9. A method according to claim 1 wherein said step (e) for preventing removal from the food material of the desired cut configuration comprises:
   inserting into said food material blade means having means at the proximal end of the blade means for supporting said blade means;
   and providing said blade means with a blade thickness, and an angular disposition relative to said support means, which avoid excessive compression of the food material when the blade means is inserted into the food material.

10. A method according to claim 9 and comprising:
    providing said blade means with a substantially uniform cross-section all the way from its proximal end to its remote end.

11. A method according to claim 10 wherein: said blade means has a blade thickness of about 0.1 inches (0.254 cm).

12. A method according to claim 9 wherein:
    said support means has a substantially planar support surface;
    the proximal end of said blade means is attached to said support surface; and
    said blade means extends substantially perpendicularly from said support surface.

13. A method according to claim 1 wherein said previously recited blade means comprises exterior blade means for defining the exterior outline of said desired configuration and said method further comprises the step of:
    inserting into the food material interior blade means;
    said interior blade means having a proximal end and a remote end and a cutting edge at said remote end of the interior blade means;

employing said interior blade means and said cutting edge thereof to define interior features of said desired configuration;

and employing said interior blade means to maintain said cutting edge of the interior blade means within the interior of the continuous closed configuration defined by said exterior blade means.

14. A method according to claim 13 and comprising:
maintaining said cutting edge of said interior blade means within the food material, spaced from the remote surface of the food material, when said proximal end of said interior blade means is at the proximal surface of the food material.

15. A method according to claim 13 wherein:
said step of maintaining the cutting edge of the interior blade means spaced from said remote surface of the food material comprises employing, for that purpose, means for supporting said exterior blade means and said interior blade means.

16. A method according to claim 15 wherein said support means comprises:
first support means for supporting said exterior blade means;
and second support means for supporting said interior blade means;
said method comprising employing said first support means to removably mount said interior blade means at a position within the continuous, closed configuration defined by said exterior blade means.

17. A method according to claim 16 and comprising:
providing said first support means with first wall means, attached at an angle to said first support means, to guide said second support means to assist in the positioning of said interior blade means.

18. A method according to claim 17 and comprising:
providing said second support means with second wall means, attached at an angle to said second support means, to nestingly engage with said first wall means; and
engaging said second wall means with said first wall means to direct said interior blade means to said position within the interior of said continuous, closed configuration.

19. A method according to claim 1 wherein said step (c) for maintaining the cutting edge of the inserted blade means spaced from the remote end of the food material further comprises:
inserting into the food material exterior blade means having a proximal end, a remote end and a cutting edge, conforming to said continuous, closed exterior outline of said desired configuration, at said remote end;
providing said exterior blade means with a predetermined dimension between said proximal end and said cutting edge, said predetermined dimension being less than said predetermined depth of the food material;
inserting into said food material interior blade means having a proximal end, a remote end, and a cutting edge conforming to the interior features of the desired configuration, at said remote end; and
providing said interior blade means with a predetermined dimension, between said proximal end thereof and said cutting edge thereof, substantially equal to said predetermined dimension of said exterior blade means, said predetermined dimension of said interior blade means being less than said predetermined depth of the food material.

* * * * *